June 22, 1954  H. HARZ  2,682,029
EXCITING SYSTEM FOR ALTERNATORS
Filed Jan. 12, 1951
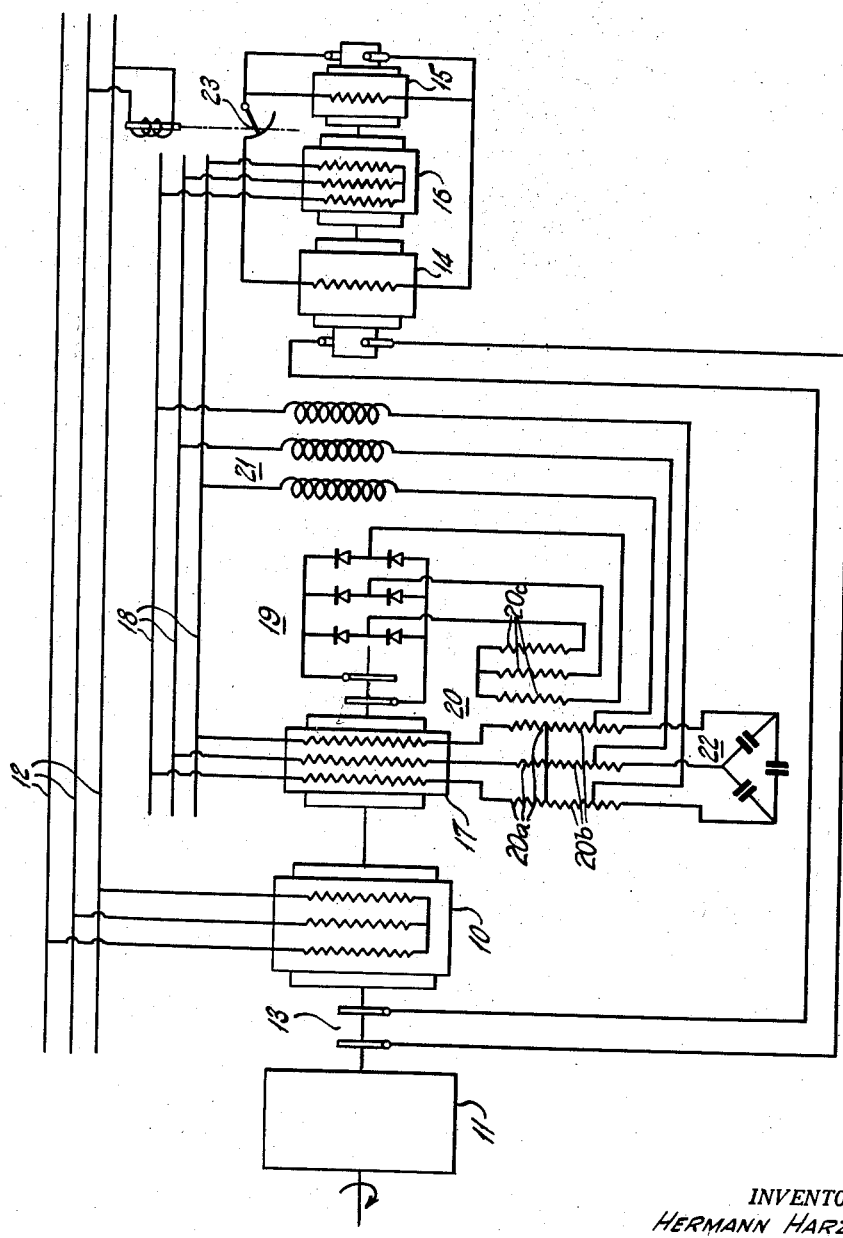
INVENTOR.
HERMANN HARZ
BY
ATTORNEY.

Patented June 22, 1954

2,682,029

UNITED STATES PATENT OFFICE 2,682,029

EXCITING SYSTEM FOR ALTERNATORS

Hermann Harz, Berlin-Siemensstadt, Germany, assignor to Radio Patents Company, a partnership of New York Application January 12, 1951, Serial No. 205,618

Claims priority, application Germany January 28, 1950

11 Claims. (Cl. 322—24)

According to known methods of exciting alternating current generators or alternators, the alternator is excited by means of a main and auxiliary exciter generator directly coupled therewith. As a consequence, the exciter generators must be designed for the speed or number of revolutions of the alternator. This results in exciter generators of considerable size, increased magnetic inertia as well as high cost, especially in the case of generators driven by slow speed hydraulic turbines.

Moreover, in arrangements of this type, the constructional height and bulk of the alternator is increased almost to double its original size, resulting in an increase in cost of the power stations and auxiliary equipment. If the exciter generators are driven by the alternator or main generator through a reduction gearing, in order to increase the speed or number of revolutions thereof, other defects and difficulties exist in practice well known to those skilled in the art.

In order to obviate these difficulties, it has been proposed to provide a special exciting converter by driving the exciter generators by a high speed motor energized by the output of the alternator or main generator or network connected thereto. In this case, precautions must be made, whereby the driving motor is prevented from stalling or falling out of step in case of a substantial and sudden line voltage change such as caused by short-circuits, sudden load variations and the like. As a consequence, substantial exciting powers are required which must be supplied by the exciting converter. Furthermore, it is necessary to provide a separate voltage source for the initial excitation of the main generator, while the exciting converter has not yet been set in operation.

In order to avoid the last-mentioned difficulties, it has furthermore been proposed to energize the driving motor of the exciting converter from a separate auxiliary generator coupled with the main generator or otherwise driven by the prime mover (turbine, etc.). This auxiliary generator will not be affected by output or line voltage changes of the main generator and insures the function of the exciter generators under varying operating conditions in the line or network connected to the main generator. The auxiliary generator, in contrast to the directly coupled main and auxiliary exciter generators referred to above, may be arranged in such a manner as not to essentially increase the size or bulk of the main generator. However, there is still required a special voltage source for initially exciting the auxiliary generator in order to start the main generator.

Among the objects of the present invention is the provision, in connection with an alternating current generator having a special exciting converter energized by an auxiliary generator, of an exciting system for said generator which is both simple in design and reliable in operation; which does not require a separate source of exciting voltage; which operates substantially automatically; and which can be easily adapted to existing generators and operating conditions.

A more general object of the invention is to provide a starting or exciting system for an alternating current generator, whereby self-excitation of the generator will be initiated safely and reliably at relatively low rotational speeds of said generator and without any outside exciting source.

Further objects and novel features of the invention will be better understood from the following detailed description taken in reference to the accompanying drawing forming part of this specification and showing a wiring diagram of an exciting system for a three-phase alternator embodying the principles of the invention.

With the foregoing objects in view, the invention involves generally the provision of a rectifier, preferably, though not necessarily, of the copper oxide, selenium or similar type, which serves to excite the magnet winding or armature of an alternating current generator, such as the auxiliary generator in an exciting system of the type described hereinabove. The rectifier is supplied by a transformer, the primary winding of which is energized by a current equal or proportional to the load current of the generator and preferably by an additional current independent of the load and supplied by a relatively large reactive impedance, such as a choke coil connected in parallel to said generator. Furthermore, means are provided such as in the form of a condenser connected in parallel to said transformer, to increase the initial weak exciting voltage by resonance amplification.

In an arrangement of this type, the small residual magnetism of the generator is sufficient to initiate the self-excitation at relatively low speeds both under load and at no-load, as has been confirmed by experiments. The small initial voltage generated as a result of the residual magnetism is sufficient to produce a multiple voltage across the condenser by resonance amplification and, since the rectifier supplying the exciting current is connected in parallel to said condenser, the amplified voltage will be sufficient to overcome the transition or contact resistance of the rectifier and slip rings, thus safely and reliably initiating the self-excitation. In order that the self-excitation may be started at the lowest possible rotational speed of the generator, the condenser and choke coil are so designed as to cause resonance at a speed as far as possible below the final or operating speed of the generator.

Referring more particularly to the drawing, there is shown diagrammatically an exciting system for a three-phase synchronous generator or alternator comprising an auxiliary generator and an exciting converter and embodying the improvements according to the present invention. Numeral 10 represents the main alternator driven by a prime mover 11, such as a low-speed hydraulic turbine, and having a stator winding feeding a three-phase transmission line or network 12. The rotor or magnet winding of the alternator is energized in a known manner, by way of a pair of slip rings 13, from an exciting converter comprising a pair of main and auxiliary direct current generators 14 and 15, respectively, the latter serving to excite the former and both being driven by an alternating current motor, preferably a high speed asynchronous motor 16. The latter is energized by an auxiliary alternating current generator 17 which is directly coupled with or otherwise driven by the main generator 10 or prime mover 11 and feeds an auxiliary line or network 18.

The exciting or magnet winding of the auxiliary generator 17 is energized from the secondary winding of an exciting transformer 20 by way of a double-wave rectifier circuit 19, the primary winding of said transformer being energized by the current of the generator 17 depending upon the generator load on the one hand, and preferably by an additional current independent of the load and supplied by a choke or equivalent reactive impedance coil 21 connected to the network 18 or in parallel to the generator 17, on the other hand. Choke coil 21 is designed for a multiple of the exciting power, whereby the two currents in the primary of the transformer 20 may be superimposed without difficulty. There is furthermore provided a condenser 22 tuned to resonance with the transformer or choke coil at the desired speed below the operating speed of the generator. In order to obtain a condenser of favorable dimensions, connection is made to a suitable fractional portion of the transformer winding, as shown in the drawing.

In the example shown in the drawing, the transformer 20 has a pair of star-connected primary windings 20a and 20b and a secondary winding 20c, winding 20a being in series with the generator winding so as to be excited by current proportional to the load current, winding 20b being connected to the network 18 so as to be excited by current proportional to the terminal voltage to the generator and winding 20c being connected to the rectifier 19. Furthermore, the three-phase condenser 22 is shunted across a portion of the primary winding 20b, to provide a suitable capacitative current sufficient to compensate the inductive current and to effect resonance amplification at low generator speed, in the manner described.

An advantage of a system described hereinbefore is the fact that no switching operations are required both during the starting and operation of the generator. As soon as the main and auxiliary generators 10 and 17 have been started by the turbine or other prime mover 11, the self-excitation of the auxiliary generator sets in at a predetermined speed, such as at a speed 40% below the operating speed. As a result, the driving motor 16 of the exciting converter will be started, thus in turn initiating the excitation of the main generator 10 by the exciting generators 14 and 15. The latter may be controlled in a normal manner by means of a manual or automatic voltage regulator 23. Sudden voltage changes, such as caused by short-circuits in the line or network 12 will have no effect upon the auxiliary generator 17 as well as on the driving motor 16 energized by the latter. On the other hand, the system operates in the same manner as if both the main and auxiliary exciter generators were coupled directly with the main alternator. No external voltage source is required for initiating the excitation and all difficulties associated with directly coupled main and auxiliary exciter generators are substantially overcome. As a result, the amount of auxiliary equipment required remains within tolerable limits.

From practical tests, it was found that a main alternator of 30,000 kva. driven at 75 revolutions per minute required an auxiliary generator of 550 kva. at 75 revolutions per minute which in turn required an exciting power of 20 kw. at 120 v. for which the rectifier 19 had to be designed. The rectifier transformer 20 had a power rating of about 40 kva., the choke coil 24 of about 75 kva. and the condenser 22 of about 22 kva. for a resonance point at about 40% of the final or operating speed of the alternator.

If the resonance point is close to the operating speed, the rating for the condenser will be only about 3.5 kva. This small power rating for the condenser is due to the fact that at the operating voltage of the generator only about one-fifth of the generator voltage is applied to the condenser.

The condenser 22 is required only for initiating the self-excitation and may be disconnected in part or entirely as soon as the excitation has been started. This disconnection may be effected either manually or automatically by means of a centrifugal switch of known type associated with either the main or auxiliary generator. In this case of limited operation, it is possible to use electrolytic condensers which provide a relatively large capacity at small size and bulk. The initiation of the excitation at low rotational speeds may be facilitated by connecting further condensers, such as electrolytic condensers of large capacity, in parallel to the stator winding of the auxiliary generator, before any appreciable frequency or voltage has been generated.

In certain cases, the choke coil 21 may be omitted, in which case the excitation of the auxiliary alternator 17 may be initiated by the voltage resulting from the residual magnetism of the auxiliary generator and acting upon the short-circuit impedance of the driving motor 16. In this case, the condenser 22 is adjusted to resonance with the reactive impedance of the auxiliary generator 17 and driving motor 16 for a speed at which initiation of the excitation of the exciting converter is desired.

After the main alternator has been brought to full operating speed, the exciting winding of the auxiliary generator 17 may be disconnected from the rectifier and connected to the generator 15. In this case, the rectifier and auxiliary equipment may be designed for only the relatively short operating periods of starting or exciting the main and auxiliary generators.

In the foregoing, the invention has been described with reference to a specific illustrative system. It will be apparent, however, that changes and variations, as well as the substitution of equivalent elements and circuits for those shown for illustration, may be made within the broader scope and spirit of the invention as defined in the appended claims.

Thus, while an exciter system comprising a main alternator, auxiliary alternator and exciting converter is shown in the drawing, it is understood that the inventive circuit may be used in connection with any alternating current generator systems. Thus, the alternator 17, line 18, rectifier 19, transformer 20, choke coil 21 and condenser 22 represent a generating system independently of the alternator and exciting converters 14, 15, 16 and may serve for any purpose other than for exciting a main alternator, as shown in the drawing for illustrative purposes.

Furthermore, although a three-phase system has been shown in the drawing, the invention may be used with equal advantage in connection with two-phase or single-phase alternators or circuits, as will be readily understood.

In the drawing, the condenser 22 is shown connected in parallel to and or a suitable fractional portion of one of the primary windings of the transformer 20 to amplify the voltage applied to the rectifiers 19 by the resonance effect. It will be understood, that the condenser may be connected to the other primary winding or to the secondary winding of the transformer 20, to secure resonance and increase of the output voltage, in accordance with the principles of the invention.

The specification and drawing are accordingly to be regarded in an illustrative rather than in a limiting sense.

I claim:

1. A system for self-excitation of an alternating current generator having a generating winding and a direct current field winding comprising rectifier means connected to said field winding to apply direct current thereto, transformer means to apply alternating current from said generator winding to said rectifier means, and tuning condenser means connected to said transformer means and adapted to resonate therewith at a frequency corresponding to a generator speed substantially below the normal operating speed thereof.

2. A system for self-excitation of an alternating current generator having a generating winding and a direct current field winding comprising rectifier means connected to said field winding to apply direct current thereto, a transformer having a primary winding connected to said generating winding and a secondary winding connected to said rectifier means to apply alternating current thereto, and condenser means connected in parallel to said primary winding and adapted to resonate therewith at a frequency coresponding to a generator speed substantially below the normal operating speed thereof.

3. In combination with an alternating current generator having generating and exciting windings, a transformer having first and second primary windings and a common secondary winding, means to energize said first primary winding by the generated current, further means to energize said second primary winding by current proportional to the voltage of said generator, rectifier means connecting said secondary winding with said exciting winding, and tuning condenser means connected to said transformer, to increase the output voltage by resonance amplification at a predetermined speed below the operating speed of said generator.

4. In combination with an alternating current generator having generating and exciting windings, a transformer having first and second primary windings and a common secondary winding, means for connecting said first primary winding in series with said generating winding, reactive impedance means, means for connecting said second primary winding across said generator in series with said impedance means, rectifier means connecting said secondary winding with said exciting winding, and tuning condenser means connected to said transformer, to increase the output voltage by resonance amplification at a predetermined speed below the operating speed of said generator.

5. In combination with an alternating current generator having generating and exciting windings, a transformer having first and second primary windings and a common secondary winding, means for connecting said first primary winding in series with said generating winding, inductive reactor means, further means to connect said second primary winding across said generator in series with said reactor means, rectifier means connecting said secondary winding with said exciting winding, and tuning condenser means connected to said transformer, to increase the output voltage by resonance amplification at a predetermined speed below the operating speed of said generator.

6. In combination with an electrical system of the type comprising a main alternator having generating and direct current exciting windings, an auxiliary alternator having generating and exciting windings, a prime mover driving both said alternators and an exciting converter energized by said auxiliary alternator to produce exciting current for said main alternator, means for self-exciting said auxiliary alternator comprising a transformer having a primary winding energized by current generated by said auxiliary alternator and a secondary winding, circuit connections including rectifier means between said secondary winding and the exciting winding of said auxiliary aternator, and condenser means connected to said transformer and adapted to resonate therewith at a predetermined speed substantially below the operating speed of said alternators.

7. In combination with an electrical system comprising a main alternator having generating and direct current exciting windings, an auxiliary alternator having generating and exciting windings, a prime mover driving both said alternators and an exciting converter energized by said auxiliary alternator to produce exciting current for said main alternator, means for self-exciting said auxiliary alternator comprising a transformer having a primary winding energized by current generated by said auxiliary alternator and a secondary winding, circuit connections including rectifier means between said secondary winding and the exciting winding of said auxiliary alternator, and a condenser connected in parallel to said primary winding and adapted to resonate therewith at a predetermined speed substantially below the operating speed of said alternators.

8. In combination with an electrical system of the type comprising a main alternator having generating and direct current exciting windings, an auxiliary alternator having generating and exciting windings, a prime mover driving both said alternators and an exciting converter energized by said auxiliary alternator to produce exciting current for said main alternator, means for self-exciting said auxiliary alternator comprising a transformer having a pair of primary windings and a common secondary winding, means to energize one of said primary windings by current proportional to the load current of said auxiliary alternator, further means for energizing the other of said primary windings by current proportional to the voltage of said auxiliary alternator, circuit connections including rectifier means between said secondary winding and the exciting winding of said auxiliary alternator, and condenser means connected to said transformer and adapted to resonate therewith at a predetermined speed below the operating speed of said alternators.

9. In combination with an electrical system of the type comprising a main alternator having generating and direct current exciting windings, an auxiliary alternator having generating and exciting windings, a prime mover driving both said alternators and an exciting converter energized by said auxiliary alternator to produce exciting current for said main alternator, means for self-exciting said auxiliary alternator comprising a transformer having a pair of primary windings and a common secondary winding, means for connecting one of said primary windings in series relation to the generating winding of said auxiliary alternator, means including series inductance means for connecting the other of said primary windings in parallel relation to the generating winding of said auxiliary alternator, circuit connections including rectifier means between said secondary winding and the exciting winding of said auxiliary alternator, and condenser means connected in parallel to one of said primary windings and adapted to resonate therewith at a predetermined speed below the operating speed of said alternators.

10. A system for self-excitation of an alternating current generator having generator and direct current field windings comprising rectifier means connected to said field winding to apply direct current thereto, and means including resonant circuit means to apply alternating current from said generator winding to said rectifier means, said resonant circuit means being tuned to a frequency substantially below the operating frequency of the generator.

11. In combination with an alternating current generator having a generating winding and direct current exciting winding, rectifier means connected to said exciting winding to apply direct current thereto, transformer means to convey a pair of superposed currents from said generator to said rectifier means being proportional, respectively, to the voltage generated by and to the load current passing through said generator, and condenser means connected to said transformer means and adapted to resonate therewith at a frequency corresponding to a speed of said generator substantially below the normal operating speed thereof.

References Cited in the file of this patent

UNITED STATES PATENTS

| Number | Name | Date |
|---|---|---|
| 518,217 | Bell | Apr. 17, 1894 |
| 729,795 | Reist | June 2, 1903 |
| 1,387,469 | Chubb | Aug. 16, 1921 |
| 2,208,416 | Friedlander et al. | July 16, 1940 |

FOREIGN PATENTS

| Number | Country | Date |
|---|---|---|
| 6,103 | Great Britain | of 1909 |
| 207,519 | Germany | Feb. 25, 1909 |